May 30, 1950 — O. JOHNSON — 2,509,824
WINDROWER TRAILER
Filed Feb. 2, 1948
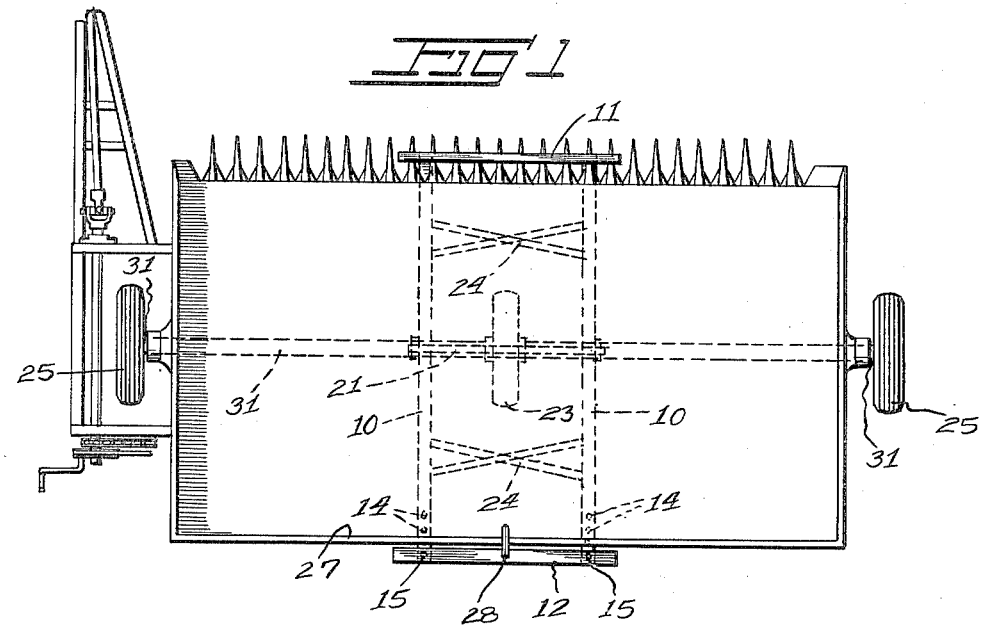
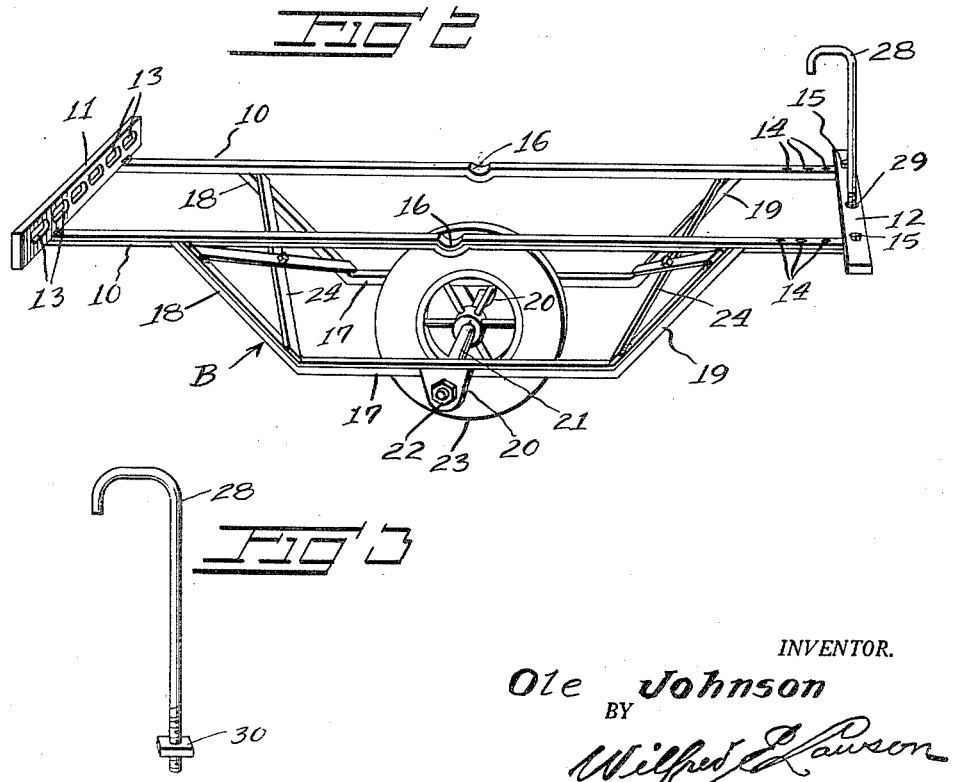
INVENTOR.
Ole Johnson
BY Wilfred Lawson
ATTORNEY Patented May 30, 1950

2,509,824

UNITED STATES PATENT OFFICE 2,509,824

WINDROWER TRAILER

Ole Johnson, Rolla, N. Dak.

Application February 2, 1948, Serial No. 5,767

6 Claims. (Cl. 56—1)

My invention relates to agricultural machinery and more particularly to windrower trailers.

The main object of my invention is to provide a trailer adapted to be pushed under the raised platform of a windrower and to be secured in working position by simply pulling the trailer back a few inches, whereby some of the cutter bar guards engage corresponding openings in the front end member of the trailer frame, and by securing the rear end of the trailer to the windrower by means of a single hook bolt.

Other objects of my invention not specifically mentioned may appear in the following specification describing my invention with reference to the accompanying drawing illustrating a preferred embodiment of my invention. It is, however, to be understood, that my invention is not to be limited or restricted to the exact construction and combination of parts described in the specification and shown in the drawing, but that such changes and modifications may be made which fall within the scope of the claims appended hereto.

In the several figures of the drawing, similar parts are designated by similar reference characters and Figure 1 is a view in top plan of a conventionally illustrated windrower, showing the trailer of the present invention in operative position in connection therewith.

Figure 2 is a view in perspective of the trailer structure.

Figure 3 is a view in perspective of the coupling element by which the rear end of the windrower is connected with the trailer.

The windrower trailer forming the subject matter of my invention comprises an elongated rectangular frame F of welded construction consisting of two longitudinal side members 10, a transverse front member 11 and a transverse rear bar 12. The transverse front member 11 consists preferably of a flat bar standing on edge and extending at both of its ends somewhat beyond the side members 10, to which it is firmly secured, preferably by welding. The transverse front member 11 is provided with a row of longitudinally extending slots 13 for a purpose to be described later.

The longitudinal side members 10 are preferably made from angle iron and arranged so that one leg of each angle is positioned horizontally and the other one vertically, and that this vertical leg extends downwardly from the outer edge of the horizontal leg. Each horizontal leg is provided with a row of holes 14 adjacent its rear end, and these holes are arranged at equal distances from the rear ends of the angles 10 and from each other. The transverse rear bar 12 lies flatly on top of the horizontal legs of the two angles 10 and is adjustably secured to said angles by means of bolts 15 or the like extending through the transverse rear bar 12 and selectively engaging any corresponding pair of the holes 14. A concave notch 16 is provided in the top surface of each longitudinal frame member 10 and is located approximately centrally between the ends of said members.

On each longitudinal member a bracket B is secured and consists of a horizontal middle portion 17, a forwardly and upwardly extending front portion 18 and a rearwardly and upwardly extending rear portion 19. The brackets are preferably formed from angle iron, and the ends of the front and rear portions are secured to the vertical leg of the corresponding angle forming the side frame member 10. The brackets B are arranged so that the longitudinal centers of the middle portions 17 are located approximately under the notches 16 in the side frame members 10. A bracket plate 20 is welded onto the central portion of each middle member 17 and extends downwardly therefrom. An axle 21 extends through both of these bracket plates and is secured in position by means of hub nuts 22 or the like. Centrally between the bracket plates 20, a trailer wheel 23 is rotatably mounted on the axle 21. In order to reinforce the brackets B, cross braces 24 may be secured to the front and rear portions 18 and 19 respectively of the two brackets and may extend between the two brackets.

The above described windrow trailer may be placed into working position by raising the windrower to be supported by the trailer in any convenient manner, for instance, by placing one of the windrower wheels 25 on a block, a rock or a pile of dirt and by pushing the trailer under the windrower from the back at any desired place so that the trailer sides extend parallel to the windrower sides, and the front end of the trailer projects forwardly beyond the windrower. The trailer is then pulled back so that some of the cutter bar guards 26 enter into corresponding slots 13 in the transverse front frame member 11. The rear transverse bar 12 is secured to the side frame members 10 so that the rear bar is located underneath the back board 27 of the windrower, and the upper hook-shaped end of a hook-bolt 28 is hooked over the upper edge of the back board. The lower end of the hook-bolt is inserted through a hole 29 located centrally in the rear bar 12 and a nut 30 on the hook-bolt is tightened to secure the trailer on the windrower in the selected position. The main axle 31 of the windrower is located in the notches 16 in the top of the side frame members 10.

The above description shows clearly that the trailer, according to my invention may be put into working position under a windrower and secured in this position easily and readily, since the front end is held in position by the engagement of some of the cutter bar guards of the windrower to the front transverse frame member of the trailer, and the rear end of the trailer is secured to the windrower by means of a single bolt. Furthermore, the trailer according to my invention is adapted to be positioned in any desired place underneath the windrower so that said windrower is adapted to travel over crowned highways, while being securely supported by one of its wheels 25 and the trailer wheel 23, while the other windrower wheel is lifted from the ground, whereby the windrower is enabled to travel over roads with narrow grades.

I claim:

1. A carrier for a windrower having a wheel supported axle, an upstanding back board and forwardly extending cutter bar guards, comprising a relatively long rectangular frame having a length greater than the front to rear extent of the windrower beneath which it positions, a ground engaging supporting wheel for said frame, a bar member disposed across the front end of the frame and having a plurality of apertures to receive the cutter bar guards, and means connected with the back end of the frame for connection with said back board to secure the windrower in position on the frame.

2. A carrier for a windrower of the character including a wheel supported axle and forwardly extending cutter bar guards, comprising a relatively long rectangular frame having a length greater than the front to rear extent of the windrower beneath which the frame positions, a ground engaging supporting wheel for said frame, a relatively wide bar member supported uprightly on a longitudinal edge across the front end of the frame and having a plurality of apertures to receive the cutter bar guards, means carried by the back end of the frame for connection with the windrower to secure the latter in position on the frame, and means for maintaining the windrower against movement longitudinally of the frame consisting of receivers positioned intermediate the ends of the frame and in alignment transversely thereof in which the windrower axle engages.

3. A carrier of the character stated in claim 2, wherein the said means for connecting the back end of the frame with the windrower comprises a bar member disposed transversely of the frame and a relatively long J-bolt having the end of the shank portion detachably connected with said bar with the hook end positioned for detachable engagement with an adjacent part of the windrower.

4. A carrier of the character stated in claim 2, wherein the said means for connecting the rear end of the rectangular frame with the windrower, comprises a bar disposed transversely of the rear ends of the longitudinal members of the rectangular frame, means for securing the last mentioned bar member at selected adjustment positions longitudinally of the rectangular frame, and a J-bolt having the free end of the shank portion thereof detachably connected with the last mentioned bar member and having the hook portion adapted to engage an adjacent part of the windrower.

5. A carrier for a windrower having a wheel supported axle and forwardly extending cutter bar guards, comprising a relatively long rectangular frame including spaced parallel side beams, an under frame connected to the side beams and joining the side beams together to maintain the latter in spaced relation, an axle rotatably supported by said under frame in a vertical plane extending transversely of the rectangular frame substantially midway between the ends of the latter, a ground engaging supporting wheel carried by said axle, the highest part of said last mentioned wheel being below the plane of the underside of the rectangular frame, a bar member disposed across the front end of the frame and having a plurality of apertures to receive the cutter bar guards, and means at the rear end of the frame for detachably securing the latter to the adjacent rear part of the windrower.

6. A carrier of the character stated in claim 5, wherein the said side beams of the rectangular frame are provided in the top surfaces thereof with recesses which are aligned transversely of the rectangular frame, said recesses being designed to receive the said wheel supported axle of the windrower.

OLE JOHNSON.

REFERENCES CITED

The following references are of record in the file of this patent:

UNITED STATES PATENTS

| Number | Name | Date |
|---|---|---|
| 576,406 | Latimer et al. | Feb. 2, 1897 |
| 1,034,986 | Drager | Aug. 6, 1912 |
| 2,416,492 | Neeley | Feb. 25, 1947 |